United States Patent
Jin et al.

(10) Patent No.: US 10,026,020 B2
(45) Date of Patent: Jul. 17, 2018

(54) EMBEDDING SPACE FOR IMAGES WITH MULTIPLE TEXT LABELS

(71) Applicant: Adobe Systems Incorporated, San Jose, CA (US)

(72) Inventors: Hailin Jin, San Jose, CA (US); Zhou Ren, Los Angeles, CA (US); Zhe Lin, Fremont, CA (US); Chen Fang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/997,011

(22) Filed: Jan. 15, 2016

(65) Prior Publication Data

US 2017/0206435 A1 Jul. 20, 2017

(51) Int. Cl.
*G06K 9/62* (2006.01)
*G06F 17/30* (2006.01)
*G06K 9/66* (2006.01)
*G06K 9/72* (2006.01)
*G06K 9/00* (2006.01)

(52) U.S. Cl.
CPC ....... *G06K 9/628* (2013.01); *G06F 17/30253* (2013.01); *G06F 17/30268* (2013.01); *G06K 9/00684* (2013.01); *G06K 9/66* (2013.01); *G06K 9/726* (2013.01)

(58) Field of Classification Search
None
See application file for complete search history.

(56) References Cited

U.S. PATENT DOCUMENTS

| | | | |
|---|---|---|---|
| 2011/0191374 A1* | 8/2011 | Bengio | G06F 17/30244 707/780 |
| 2017/0011279 A1 | 1/2017 | Soldevila et al. | |
| 2017/0206465 A1 | 7/2017 | Jin et al. | |

FOREIGN PATENT DOCUMENTS

WO     WO-2011094757    8/2017

OTHER PUBLICATIONS

Wang L, Li Y, Lazebnik S. Learning Deep Structure-Preserving Image-Text Embeddings. arXiv preprint arXiv:1511.06078. Nov. 19, 2015.*

(Continued)

*Primary Examiner* — Vu Le
*Assistant Examiner* — Tracy Mangialaschi

(57) ABSTRACT

Embedding space for images with multiple text labels is described. In the embedding space both text labels and image regions are embedded. The text labels embedded describe semantic concepts that can be exhibited in image content. The embedding space is trained to semantically relate the embedded text labels so that labels like "sun" and "sunset" are more closely related than "sun" and "bird". Training the embedding space also includes mapping representative images, having image content which exemplifies the semantic concepts, to respective text labels. Unlike conventional techniques that embed an entire training image into the embedding space for each text label associated with the training image, the techniques described herein process a training image to generate regions that correspond to the multiple text labels. The regions of the training image are then embedded into the training space in a manner that maps the regions to the corresponding text labels.

19 Claims, 8 Drawing Sheets

(56) References Cited

OTHER PUBLICATIONS

Karpathy, Andrej, and Li Fei-Fei. "Deep visual-semantic alignments for generating image descriptions." Proceedings of the IEEE Conference on Computer Vision and Pattern Recognition. 2015.*
Krähenbühl, Philipp, and Vladlen Koltun. "Geodesic object proposals." European Conference on Computer Vision. Springer International Publishing, 2014.*
Norouzi, Mohammad, et al. "Zero-shot learning by convex combination of semantic embeddings." arXiv preprint arXiv:1312.5650 (2013).*
Pennington, Jeffrey, Richard Socher, and Christopher D. Manning. "Glove: Global Vectors for Word Representation." EMNLP. vol. 14. 2014.*
Ren S, He K, Girshick R, Sun J. Faster R-CNN: Towards Real-Time Object Detection with Region Proposal Networks. arXiv preprint arXiv:1506.01497v2. Sep. 13, 2015.*
Frome,"DeViSE: A Deep Visual-Semantic Embedding Model", In Neural Information Processing Systems, 2013, 11 pages.
Gong,"Deep Convolutional Ranking for Multilabel Image Annotation", In International Conference on Learning Representations, 2014, 9 pages.
Krahenbuhl,"Geodesic Object Proposals", In European Conference on Computer Vision, 2014, 15 pages.
Norouzi,"Zero-Shot Learning by Convex Combination of Semantic Embeddings", In International Conference on Learning Representations, 2014, 9 pages.
"Combined Search and Examination Report", GB Application No. 1619343.5, dated Apr. 28, 2017, 5 pages.
"Combined Search and Examination Report", GB Application No. 1619341.9, dated Apr. 28, 2017, 7 pages.
Wang,"CNN-RNN: A Unified Framework for Multi-Label Image Classification", 2016 IEEE Conference on Computer Vision and Pattern Recognition (CVPR), Jun. 27, 2016.
Weston,"Large Scale Image Annotation: Learning to Rank with Joint Word-Image Embeddings", Machine Learning, vol. 81, Jul. 27, 2010, 16 pages.

* cited by examiner

700

702
Generate an embedding space in which both images and text labels are embedded, including modeling semantic concepts described by text labels of a text vocabulary as distributions and mapping representative images to respective distributions 704
Use the embedding space that models the semantic concepts as distributions to annotate an image

EMBEDDING SPACE FOR IMAGES WITH MULTIPLE TEXT LABELS

BACKGROUND

Image classification is a fundamental problem in computer vision. Broadly speaking, image classification attempts to extract semantic information from an image so that the image can be labeled to describe the content of the image. Semantic information can include, for instance, objects depicted in an image (and locations of the image at which the objects are depicted), scenes depicted in an image (e.g., whether the image depicts a beach or a sunset), moods associated with human faces or facial expressions depicted in an image, image aesthetics (e.g., good composition, poor composition, obeys the rule-of-thirds, and so on), image sentiment (e.g., fear, anger, and the like), and so forth.

Some conventional image classification techniques categorize images into fixed sets of classes representative of semantic information by training a multi-class classifier. However, because semantic relationships between classes can be complex (e.g., hierarchical, disjoint, etc.), it is difficult to define a classifier that encodes many of the semantic relationships. To address these shortcomings, visual-semantic embedding techniques have been developed. Conventional visual-semantic embedding techniques leverage semantic information from unannotated text data to learn semantic relationships between text labels and explicitly map images into a rich semantic embedding space. These conventional visual-semantic embedding techniques are limited to annotating images with a single text label, however. Accordingly, conventional techniques for automatically associating text labels with images to describe their content are inadequate for some image labeling tasks.

SUMMARY

Embedding space for images with multiple text labels is described. In the embedding space both text labels and image regions can be embedded. The text labels embedded in the embedding space are configured to describe semantic concepts exhibited in image content, e.g., whether an image includes a beach or a sunset, image aesthetics such as whether an image is well-composed according to photography "rules", and so on. The embedding space is trained to semantically relate the embedded text labels so that text labels like "sun" and "sunset" are more closely related than text labels like "sun" and "bird". Training the embedding space also includes mapping representative images, having image content which exemplifies the semantic concepts, to respective text labels.

Unlike conventional visual-semantic embedding techniques, the techniques described herein train the embedding space using training images that are each associated with multiple text labels. Rather than embed an entire training image into the embedding space for each of the multiple text labels associated with the training image, the techniques described herein process the training image to generate regions that correspond to the multiple text labels. The regions of the training image are then embedded into the embedding space in a manner that maps the regions to the corresponding text labels. The mapping between the regions of the training image and the corresponding text labels is learned as a mapping function. Once the embedding space is trained, the embedding space can be used through application of the mapping function to annotate an image with multiple text labels to describe the content of the image. To annotate an image, multiple semantically meaningful regions are proposed for the image. At least one text label is then discovered from the embedding space for each of the multiple regions using the mapping function learned during training. The learned mapping function takes the image regions of the image to be annotated as input and maps each of the image regions to text labels in the embedding space. The text labels discovered for the multiple regions of the image can then be used to annotate the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
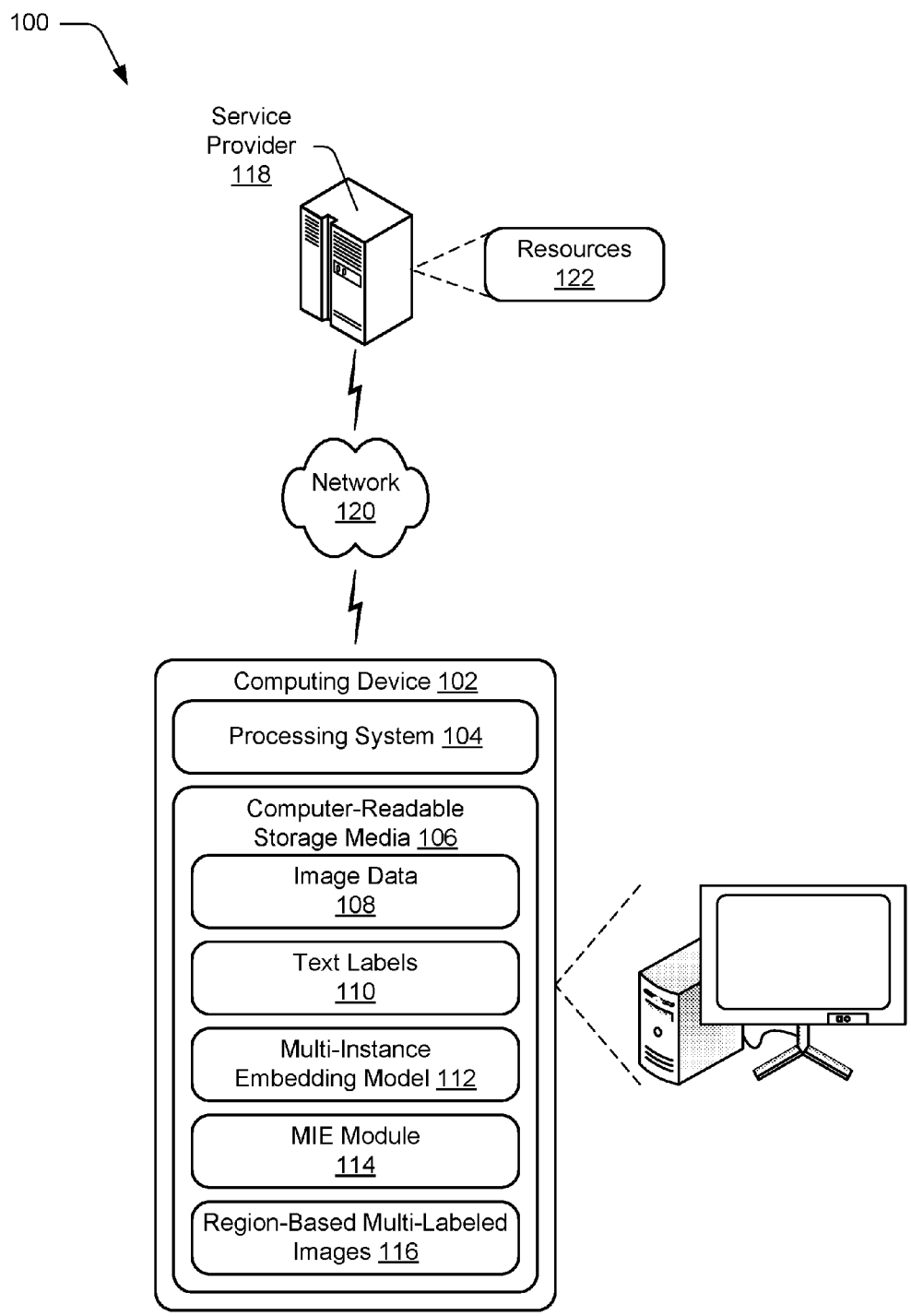
FIG. 1 is an illustration of a digital environment in an example implementation that is operable to employ techniques described herein.

Conventional visual-semantic embedding techniques leverage semantic information from unannotated text data to learn semantic relationships between text labels and explicitly map images into a rich semantic embedding space. Although these conventional visual-semantic embedding techniques are used for image tasks on images with single labels, such conventional techniques have not been extended for use on images with multiple text labels. These drawbacks render conventional visual-semantic techniques unsuitable for a variety of applications, since images are often associated with multiple text labels. In addition, extending a single-label visual-semantic model to a multi-label one is a nontrivial task. Implementation of conventional visual-semantic techniques is based, in part, on an assumption that image labels correspond to an entirety of an image. However, this is simply not the case for images associated with multiple text labels. Rather, different text labels of a multi-labeled image can correspond to different regions of the image.

Embedding space for images with multiple text labels is described. As used herein, an "embedding space" refers to a computer-generated model capable of representing text labels and images that have been embedded in the model. Embedding spaces are also capable of representing relationships between the embedded text labels and images, such as semantic relationships between different text labels and correspondences between images and text labels. Using the techniques described herein, training images that are each associated with multiple text labels are used to train the embedding space. Once the embedding space is trained, the embedding space can be used to annotate images. In particular, the embedding space can be used to discover multiple text labels for an image. The multiple text labels discovered can then be associated with the image (e.g., through inclusion with the image as metadata, or in other manners) to annotate the image.

With regard again to the embedding space used herein, the embedding space is configured as a joint-image text embedding space which represents both text labels and images (e.g., regions of images) that have been embedded in the embedding space. In particular, the text labels embedded are from a text vocabulary selected for training the embedding space and can be used to describe semantic concepts depicted in images. The text labels are also semantically related in the embedding space as part of training the embedding space. Semantically relating text labels in the embedding space involves encoding relationships between text labels that indicate how closely semantic concepts described by the text labels are related. By way of example, the text labels of the text vocabulary are semantically related so that text labels like "sun" and "sunset" are more closely related than the text labels "sun" and "bird".

In addition to semantically relating the text labels, the embedding space is trained so that image regions that exemplify the semantic concepts described by the text labels of the text vocabulary are embedded in the embedding space and mapped to the text labels. The image regions that are embedded as part of training the embedding space are extracted from training images, which have been selected for the purpose of training the embedding space and are each associated with multiple text labels. In the training, the image regions are mapped to the respective text labels, e.g., a region of a training image that depicts a sun can be mapped to the text label "sun" in the embedding space while a different region of the training image that depicts a bird can be mapped to the text label "bird" in the embedding space.

As noted above, each of the training images used to train the embedding space is associated with multiple text labels before being used to train the embedding space, e.g., the text labels are associated with a training image as metadata. As part of training the embedding space, each training image is processed to generate a set of regions of the training image that correspond to the multiple text labels associated with the training image. To generate a set of regions, a training image is initially processed according to a region proposal technique (e.g., geodesic object proposal), the result of which is a set of candidate regions. For each individual label of the multiple labels associated with the training image, a proposed candidate region is selected that is determined to best match the semantic concept described by the text label. This is effective to form a region-to-label correspondence for the training image. Further, this approach prevents images from being embedded in the embedding space in a manner that relates images to text labels that are minimally related to the images.

After the set of regions is generated for the text labels of a training image, the regions are embedded in the embedding space. With regard to "embedding" regions in the embedding space, as used herein "embedding" regions in the embedding space involves extracting features of the image regions, converting the extracted features into data that is representative of the extracted data (e.g., vectors), and inserting the representation in the embedding space so that the region is represented by the embedding space. The embedding of image regions also involves forming relationships in the embedding space between the inserted representation and corresponding text labels. For instance, the regions of a training image are embedded based on positions at which the multiple text labels that correspond to the training image regions are embedded. By way of example, an image region that depicts a sun is embedded in the embedding space based on a position where the text label "sun" is embedded. This process is carried out for the sets of regions generated for the training images.

The embedding space, once trained, can then be used to annotate images with multiple text labels. Consider an example in which an image not yet associated with text labels is received as input for annotation. Text labels can be discovered for the query image from the trained embedding space to describe the content of the query image. To discover the text labels from the trained embedding space, semantically meaningful regions of the query image are determined, e.g., using one or more known techniques, such as geodesic object proposal, which are capable of determining semantically meaningful regions of images. Once the semantically meaningful regions of the query image are determined, the semantically-meaningful regions are then compared to the image regions embedded in the embedding space during training, e.g., by comparing vectors indicative of visual characteristics of the embedded regions and the determined regions of the query image. Based on the comparison, the determined regions of the query image can be mapped to visually similar embedded image regions, and thus also to the text labels to which the similar embedded image regions correspond.

The query image can then be annotated with a number (e.g., two or more) of text labels discovered in this process. For example, the query image can be annotated with a predetermined number of discovered labels for which a similarity between a determined region of the query image and an embedded region is the greatest, e.g., the text labels for the five determined regions of the query image that are most similar to embedded regions. Alternately or in addition, the query image can be annotated with each of the discovered text labels for which a similarity between determined regions of the query image and embedded regions surpasses a threshold, e.g., the text label of any determined region that is at least eighty-five percent similar to an embedded region.

Unlike conventional visual-semantic embedding techniques, the techniques described herein enable a joint image-text embedding space to be trained using training images having multiple text labels, and enable an image to be annotated with multiple text labels using the joint image-text embedding space. The techniques described herein also enable semantically meaningful regions to be discovered for each of multiple text label associated with an image. In addition, the techniques described herein provide an advantage in zero shot learning over conventional techniques, e.g., to classify images in new categories not previously described by the text labels of the embedding space.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that includes one or more processing devices (e.g., processors) and one or more computer-readable storage media 106. The illustrated environment 100 also includes image data 108, text labels 110, multi-instance embedding model 112, multi-instance embedding module 114 ("MIE module 114"), and region-based multi-labeled images 116, which are embodied on the computer-readable storage media 106 and operable via the processing system 104 to implement corresponding functionality described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 118, configured to communicate with computing device 102 over a network 120, such as the Internet, to provide a "cloud-based" computing environment. Generally speaking, service providers 118 are configured to make various resources 122 available over the network 120 to clients. In some scenarios, users sign up for accounts that are employed to access corresponding resources from a provider. The provider authenticates credentials of a user (e.g., username and password) before granting access to an account and corresponding resources 122. Other resources 122 are made freely available, (e.g., without authentication or account-based access). The resources 122 can include any suitable combination of services and/or content typically made available over a network by one or more providers. Some examples of services include, but are not limited to, image storage and/or sharing services (e.g., Flickr®), social network services (e.g., Facebook®, Twitter®, Instagram®, Hyperlapse®, and the like), search engine services capable of returning images as search results, and so forth.

These services serve as sources of significant amounts of image data. Image data 108 represents such image data, which may be formatted in any of a variety of image formats, including but not limited to JPEG, TIFF, RAW, GIF, BMP, PNG, and so on. The image data made available through the services may be posted by users that have accounts with those services. For example, a user having an account with an image storage and/or sharing service uploads images, such as those taken with a digital camera of the user, or those sent to the user via electronic means. A user of the image storage and/or sharing service may then share their uploaded images with others, such as by providing a link to albums of images or to a profile of the user.

In addition, the images are capable of being associated with additional information to describe the images. For example, the images represented by the image data 108 can include metadata that describes the images. By way of example, the metadata of an image can describe a pixelwise size of the image, a storage size of the image, a camera device used to capture the image, a date the image was captured, a date the image was last modified, and so on. In addition, the images represented by the image data 108 can be associated with metadata that describes the content depicted in the images. For instance, the metadata can be configured as text labels, and the images can be annotated with those text labels that describe their content. Such text labels can describe objects depicted in an image (and locations of the image at which the objects are depicted), scenes depicted in an image (e.g., whether the image depicts a beach or a sunset), moods associated with human faces or facial expressions depicted in an image, image aesthetics (e.g., good composition, poor composition, obeys the rule-of-thirds, and so on), image sentiment (e.g., fear, anger, and the like), and so forth. Broadly speaking, the text labels 110 represent a variety of text labels with which images can be annotated.

The MIE module 114 represents functionality to implement techniques for an embedding space for images with multiple text labels as described herein. As part of doing so, the MIE module 114 creates an embedding space that is configured as a joint image-text embedding space. By "joint image-text embedding space" it is meant that both the text labels 110 and representative images (e.g., regions of images) from the image data 108 can be embedded therein. The multi-instance embedding model 112 is representative of such an embedding space. Further, the MIE module 114 represents functionality to train the multi-instance embedding model 112 so that, given an image region, the multi-instance embedding model 112 can be used to discover a text label that describes the content depicted in the image region.

To train the multi-instance embedding model 112, the MIE module 114 semantically relates the text labels embedded in the multi-instance embedding model 112 according to the semantic concepts described by the text labels. For example, the MIE module 114 semantically relates the text labels so that the text labels "sun" and "sunset" are more closely positioned in the multi-instance embedding model 112 than the text labels "sun" and "bird".

The MIE module 114 also trains the multi-instance embedding model 112 using training images, which can be included as part of image data 108. The training images are each, before the training, already associated with multiple text labels that describe the content depicted. For each training image, the MIE module 114 processes the image to generate a set of regions of the image that correspond to the training image's multiple text labels. Thus, the MIE module 114 forms a region-to-label correspondence for each training image, such that a region of the training image is selected to represent each of the multiple text labels.

The MIE module 114 then embeds the set of regions into the multi-instance embedding model 112. In particular, the MIE module 114 embeds a region into the multi-instance embedding model 112 based on a position where the region's corresponding label is embedded. For example, when a training image is associated with the text label "sun", a region of the training image corresponding to "sun" is selected. The MIE module 114 then embeds the region of the training image that corresponds to "sun" based, at least in part, on a position in the multi-instance embedding model 112 where the text label "sun" is embedded. The MIE module 114 can perform this process for each training image in a set of training images. By training the multi-instance embedding model 112 with the training images, a mapping function is learned. Given an image (e.g., an image region) the mapping function is capable of mapping the given image to a position in the multi-instance embedding model 112. The given image is then determined to correspond to a text label embedded in the multi-instance embedding model 112 nearest the position to which the given image is mapped.

In one or more implementations, the multi-instance embedding model 112 is configured to model the semantic concepts described by the text labels and depicted by representative images as distributions, e.g., Gaussian distributions, Gaussian Mixtures, and so on. This contrasts with techniques which represent semantic concepts as single points. Embedding images that are associated with multiple text labels to single points in a visual-semantic embedding space can cause visual-semantic mapping functions to be easily confused, e.g., causing the techniques to be less accurate in predicting the content depicted in an image.

In addition, the MIE module 114 represents functionality to annotate images. By "annotate" it is meant that text labels which describe the content depicted in an image can be chosen and associated with the image. To annotate an image, the MIE module 114 determines a set of regions of the image. In particular, the MIE module 114 extracts regions from the image that are determined to be semantically meaningful, e.g., using a known technique such as geodesic object proposal since it covers both foreground and background regions. The MIE module 114 then discovers text labels for the regions by mapping the regions to the text labels using the learned mapping function. Using the mapping function, the MIE module 114 can determine which of the images embedded in the multi-instance embedding model 112 are similar to a region to be annotated, and associate the text label that corresponds to similar embedded images with the region to be annotated.

In this way, an image can be initially associated with a large number of text labels, e.g., one for each of the determined regions. The number of text labels can be reduced, however, so that an image is annotated with the labels that are determined to be most representative of the image content. For example, the MIE module 114 can annotate an image with a predetermined number of text labels. In this scenario, the MIE module 114 selects the predetermined number of text labels for which the regions of the image are most similar to images embedded in the multi-instance embedding model 112. Alternately, the MIE module 114 selects a variable number of text labels for images that are to be annotated. In this alternate scenario, the number of text labels selected can be based on a threshold similarity, such that with any regions of the image for which the similarity with an embedded image is above the threshold similarity, the discovered text label is used to annotate the image. In any case, the region-based multi-labeled images 116 represent images that the MIE module 114 annotates with multiple text labels by determining image regions and using the multi-instance embedding model 112 to discover labels for the image regions.

In one or more implementations, the MIE module 114 is implementable as a software module, a hardware device, or using a combination of software, hardware, firmware, fixed logic circuitry, etc. Further, the MIE module 114 can be implementable as a standalone component of the computing device 102 as illustrated. In addition or alternatively, the MIE module 114 can be configured as a component of a web service, an application, an operating system of the computing device 102, a plug-in module, or other device application as further described in relation to FIG. 8.

Having considered an example environment, consider now a discussion of some example details of the techniques for embedding space for images with multiple text labels in accordance with one or more implementations.

Embedding Space for Images with Multiple Text Labels

This section describes some example details of techniques for embedding space for images with multiple text labels in accordance with one or more implementations. The discussion refers to FIG. 2, which illustrates an image with multiple text labels and which illustrates concepts pertinent to the functionality described herein.

Figure 2:
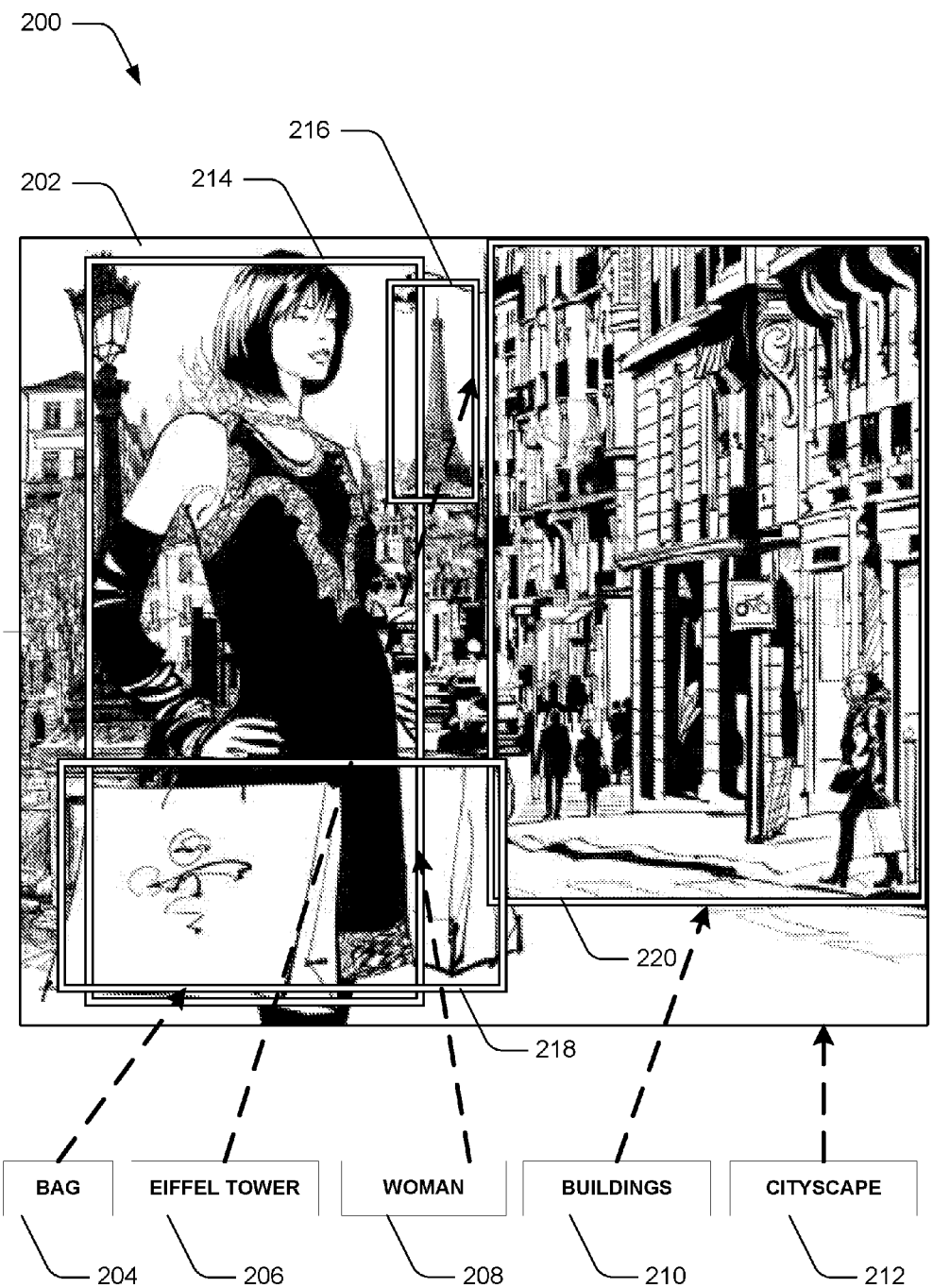
FIG. 2 is an example implementation depicting an image with multiple text labels and indications of regions of the image that correspond to the multiple text labels.

In particular, FIG. 2 depicts generally at 200 an image 202 with text labels 204, 206, 208, 210, 212. FIG. 2 also depicts image regions 214, 216, 218, 220. The image 202 can represent a training image that is already associated with the text labels 204, 206, 208, 210, 212 and for which the MIE module 114 selects the image regions 214, 216, 218, 220 to correspond to the text labels, e.g., the image region 214 to correspond to the text label 208, the image region 216 to correspond to the text label 206, the image region 218 to correspond to the text label 204, the image region 220 to correspond to the text label 210, and an image region representative of the entirety of the image 202 to correspond to the text label 212. Alternately, the image 202 can represent an image that is annotated by the MIE module 114, such that the MIE module 114 generates proposed regions for the image 202, discovers text labels for the proposed regions using the multi-instance embedding model 112, and selects the text labels 204, 206, 208, 210, 212 that correspond to the image regions 214, 216, 218, 220 (as well as a region corresponding to an entirety of the image) from the discovered text labels for describing the content of the image 202.

Figure 3:
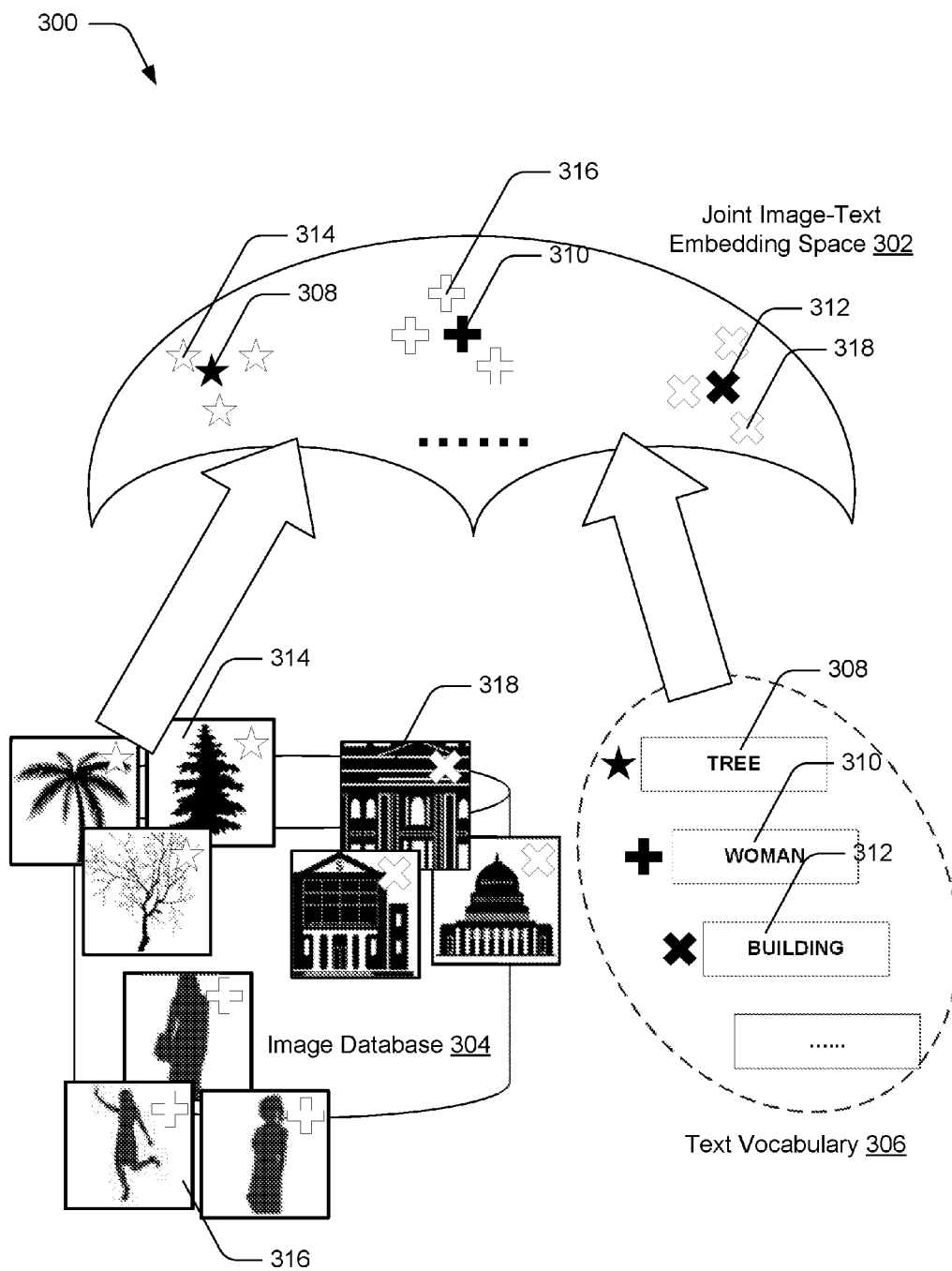
FIG. 3 is an example implementation of an embedding space that is configured to embed both text labels and image regions that are mapped to the text labels.

FIG. 3 depicts generally at 300 an example embedding space in which both text labels and image regions that are mapped to the text labels can be embedded. In particular, FIG. 3 includes joint image-text embedding space 302 (which can correspond to the multi-instance embedding model 112 of FIG. 1), image database 304 (which includes images used by the MIE module 114 to train the joint image-text embedding space 302), and text vocabulary 306 (which can correspond to the text labels 110 of FIG. 1 that are usable to describe semantic concepts depicted in images).

The joint image-text embedding space 302 is configured to have both text labels and images (entire images and portions of images) embedded therein. The image database 304 and the text vocabulary 306 represent the images and the text labels, respectively, that the MIE module 114 uses to train the joint image-text embedding space 302, e.g., so that the joint image-text embedding space 302 can be used to discover text labels that describe content of an image. The text labels that make up the text vocabulary 306 are configured to describe semantic concepts which can be exhibited in image content. The images of the image database 304 depict image content which exemplifies the semantic concepts described by the text labels of the text vocabulary 306.

In training, the MIE module 114 semantically relates the text labels within the text vocabulary 306. Take text label 308 for "tree", for example. The MIE module 114 represents functionality to semantically relate the text label 308 for "tree" to text label 310 for "woman" and text label 312 for "building", e.g., by embedding the text labels 308, 310, 312 at positions in the joint image-text embedding space 302. The positions at which the text labels are embedded in the joint image-text embedding space 302 depends on how closely the sematic concepts described by the text labels are related. By way of example, the text label 308 for "tree" may be embedded in the joint image-text embedding space 302 so that it is positioned closer to text labels for "pine tree", "forest", and "plants" (not shown) than to the text label 310 for "woman" and the text label 312 for "building".

In FIG. 3, each of the text labels 308, 310, 312 is illustrated next to a filled-in shape that signifies the respective text label, e.g., the text label 308 for "tree" is illustrated next to a filled-in star, the text label 310 for "woman" is illustrated next to a filled-in cross, and the text label 312 for "building" is illustrated next to a filled-in X. Each of these filled-in shapes is also included in the joint image-text embedding space 302 to represent the embedding of the text labels 308, 310, 312. It should be appreciated that the depicted shape of the joint image-text embedding space 302 and the depicted positions of the filled-in shapes may not accurately reflect an actual form of the joint image-text embedding space 302 or the positions at which the MIE module 114 actually embeds the text labels 308, 310, 312. Rather, the depicted shape of the joint image-text embedding space 302 and the depicted positions of the filled-in shapes are useful for explaining the techniques described herein.

The MIE module 114 also relates the images in the image database 304 to the text labels of the text vocabulary 306. As mentioned above, the training images of the image database 304 can depict image content which exemplifies the semantic concepts described by the text labels of the text vocabulary 306. To relate the images to the text labels, the MIE module 114 embeds each image at a position in the joint image-text embedding space 302 based, in part, on a position of the corresponding text label. In other words, the MIE module 114 maps each image to the text label that describes the image content of the image, and embeds the image based on a position of that text label.

For example, the images of the image database 304 that depict a tree are embedded in the joint image-text embedding space 302 based on a position at which the text label 308 for "tree" is embedded, e.g., the MIE module 114 maps the images that depict trees to the text label 308 for "tree".

In a similar manner, images that depict a woman are embedded based on a position at which the text label 310 for "woman" is embedded, and images that depict a building are embedded based on a position at which the text label 312 for "building" is embedded. In other words, an image is embedded in the joint image-text embedding space 302 at a position that is closer to a text label to which the image corresponds than to other text labels. An image is also embedded in the joint image-text embedding space 302 closer to images that correspond to closely-related sematic concepts than to images corresponding to less closely-related semantic concepts. By way of example, an image of a tree is generally embedded in the joint image-text embedding space 302 closer to images of pine trees and forests than to images of buildings or images of women.

In FIG. 3, image set 314 represents the images of the image database 304 that depict a tree, image set 316 represents the images of the image database 304 that depict a woman, and image set 318 represents the images of the image database 304 that depict a building. The images of each image set 314, 316, 318 are illustrated with unfilled shapes that signify the images, e.g., the images of the image set 314 (which depict trees) are illustrated with unfilled stars, the images of the image set 316 (which depict women) are illustrated with unfilled crosses, and the images of the image set 318 (which depict buildings) are illustrated with unfilled X's.

These unfilled shapes are also included in the joint image-text embedding space 302 to represent the embedding of the images from the image sets 314, 316, 318, the positions of which are based on where the corresponding text labels 308, 310, 312 are embedded. Consequently, the unfilled stars which represent the images depicting trees are illustrated around the filled-in star that represents the text label 308 for "tree", the unfilled crosses which represent the images depicting women are illustrated around the filled-in cross that represents the text label 310 for "woman", and the unfilled X's which represent the images depicting buildings are illustrated around the filled-in X that represents the text label 312 for "building".

With regard to the representative images embedded in the joint image-text embedding space 302, the MIE module 114 extracts them from training images as regions. Thus, the set of images 314 that depict women can correspond to regions (e.g., portions of images less than an entirety) that are extracted from training images. Broadly speaking, to train the joint image-text embedding space 302, the MIE module 114 starts with training images that are each associated with multiple text labels. By way of example, the MIE module 114 starts with training images, such as the image 202 which is already associated with the text labels 204, 206, 208, 210, 212.

For each training image, the MIE module 114 generates a set of regions that correspond to the text labels of the training image. Consider the example of FIG. 2, in which the image 202 is associated with the text labels 204, 206, 208, 210, 212. In this example, the MIE module 114 can generate a region that corresponds to each of the text labels 204, 206, 208, 210, 212, such that the image region 214 corresponds to the text label 208 for "woman", the image region 216 corresponds to the text label 206 for "Eiffel Tower", the image region 218 corresponds to the text label 204 for "bag", the image region 220 corresponds to the text label 210 for "buildings", and the image region representative of the entirety of the image 202 corresponds to the text label 212 for "cityscape".

To generate the regions that correspond a training image's text labels, the MIE module 114 initially applies a region proposal technique to the training image. For example, the MIE module 114 applies at least one of a geodesic object proposal technique, a random region proposal technique, and so forth. Semantically meaningful regions of an image do not merely include objects depicted in a foreground of the image. Indeed, background portions of an image can also be semantically meaningful. In contrast to general object proposal techniques, the region proposal techniques used by the MIE module 114 cover both foreground and background regions of images to propose image regions.

Once a set of candidate regions is proposed for a training image, the MIE module 114 discards at least some of the proposed candidate regions. The number of candidate regions initially proposed by the object proposal techniques the MIE module 114 uses can be thousands, and using each of the proposed candidate regions for training would significantly burden computing resources. Accordingly, the MIE module 114 can apply one or more post processing techniques to discard at least some of the proposed candidate regions. For instance, the MIE module 114 can apply one or more post processing techniques to discard proposed candidate regions that fail to meet predefined size criteria or aspect ratio criteria. By way of example and not limitation, a predefined size criterion may specify that in order to use a proposed candidate region, the proposed candidate region's sides are to be at least thirty percent as long as a corresponding side of the image, e.g., for an image that is 400 pixels by 500 pixels, the MIE module 114 enforces the criterion by discarding any proposed candidate region having a size less than 120 pixels by 150 pixels. With regard to an example aspect ratio, a predefined aspect ratio criterion may specify that in order to use a proposed candidate region, the proposed candidate region's aspect ratio is to be between 1:4 and 4:1.

From the remaining proposed candidate regions, the MIE module 114 then assigns a best-matching candidate region to each text label of the training image jointly to build a region-to-label correspondence. In so doing, the MIE module 114 is configured to use a single-label embedding model. This has the effect of discarding an even greater number of the proposed candidate regions so that the number of remaining regions corresponds to the number of text labels associated with the image. The MIE module 114 then embeds these regions into the joint image-text embedding space 302. With reference to the example in FIG. 2 and in the scenario in which the image 202 is used to train the joint image-text embedding space 302, the MIE module can reduce thousands of candidate regions proposed by the region proposal techniques to the image regions 214, 216, 218, 220, as well as a region corresponding to an entirety of the image 202.

To embed the regions of the training images in the joint image-text embedding space 302, the MIE module 114 computes d-dimensional feature vectors for the regions. The MIE module 114 can compute the feature vectors for the regions, for instance, by extracting image features with a Convolutional Neural Network (CNN), e.g., one that includes convolution, pooling, and inception layers. In one particular example, the MIE module 114 extracts the image features with a Fast Region-based CNN (RCNN) technique. Said another way, given a training image and the regions that are to be embedded in the joint image-text embedding space 302, the MIE module 114 passes the training image through the CNN a single time. The MIE module 114 can then pool each region of the generated set of regions into a fixed-size feature map to obtain a final feature vector.

Consider an example in which the MIE module 114 trains the joint image-text embedding space 302 using a set of training images, each of which is associated with multiple text labels. Such a set of training images may be defined as $D \equiv \{(x_i, y_i)\}_{i=1}^{N}$, where $x_i$ represents the i-th image in the set and the N represents the number of training images in the set. Further, each image can be represented by d-dimensional feature vector $\mathbb{R}^d$ which can be computed as discussed above, such that for the i-th image of the set $x_i \in \mathbb{R}^d$. Further, each training image is associated with a set of text labels, such that for the i-th image $x_i$ the set of text labels $y_i$ is defined as $(y_i^1, \ldots, y_i^t)$, where t represent the number of text labels associated with the i-th image. It should be noted that this definition for the set of text labels allows a number of labels associated with the training images to vary from image to image.

For the sake of simplicity, the set of training images to be embedded can be denoted as $X \stackrel{\text{def}}{=} \mathbb{R}^d$. Conventional techniques formulate the classification or annotation problem for images associated with multiple text labels as a multi-class classification. In contrast to the techniques described herein, this conventional formulation predefines a fixed set of class labels such as $y_i^1 \in Y \equiv \{1, \ldots, m\}$, learns an m-way classifier or m one-against-all classifiers, and uses the learned classifier or classifiers to classify the set of training images X into the fixed set of class labels Y such that $(X \rightarrow Y)$. The scalability of such conventional techniques is limited with regard to a number of labels, however, because conventional techniques retrain the models they utilize when new labels emerge.

Rather than defining text labels as a discrete set like these conventional techniques do, visual-semantic models learn a continuous semantic space S, which captures semantic relationships among text labels and explicitly learns a mapping function $(X \rightarrow S)$ from the set of training images X to the continuous semantic space S. Thus, the MIE module 114 is configured to construct an image-label training data pair $\{(x_i, s(y_i))\}$ to learn a mapping function $f: X \rightarrow S$ for the joint image-text embedding space 302. The MIE module 114 learns the mapping function in order to map the i-th image $x_i$ of the set of training images to the joint image-text embedding space 302. The MIE module 114 learns this as a function $s(y_i)$ of the set of text labels $y_i$ that are associated with the i-th image $x_i$. The function $s(y_i)$ is learned so that a set of labels Y that are used is mapped to the continuous semantic space S such that $s: Y \rightarrow S$.

In one or more implementations, the MIE module 114 is configured to learn the continuous semantic label space S (e.g., the relationships between the text labels) using a text modeling architecture technique that is trained with unannotated text data, e.g., unannotated text data from the Internet. The text modeling architecture enables the MIE module 114 to learn similar embedding positions for semantically related text labels since synonyms are more likely to appear in similar semantic contexts. By way of example, the MIE module 114 uses a Glove model to construct a 300-dimension text label space S, which embodies the semantic relationships among text labels.

With regard to learning mapping functions, some conventional visual-semantic approaches learn the mapping function $f: X \rightarrow S$ for an embedding space with an $L_2$ loss function or ranking loss function. Generally, such functions encourage a projected embedding point for a given image to be closer to its corresponding label in the embedding space. The following is an example of such a ranking loss function used by conventional visual semantic approaches, specifically it corresponds to a pairwise hinge-ranking loss function:

$$l_{rank}(x_i, y_i) = \sum_{j \in \tau_+} \sum_{k \in \tau_-} \max\left(0, m + D_{f(x_i), y_j} - D_{f(x_i), y_k}\right)$$

Here, the term $f(\bullet)$ represents a mapping function to be learned, the term m represents a margin. For simplicity of notation, y is used instead of s(y) to denote the label vector in the continuous semantic label space S. Further, $\tau_+$ denotes a set of positive text labels, $\tau_-$ denotes a set of negative text labels, $\{y_j\}_{j \in \tau_+}$ denotes positive label vectors, and $\{y_k\}_{k \in \tau_-}$ denotes negative label vectors. The term $D_{f(x_i), y_i}$ indicates a distance between an embedding vector $f(x_i)$ for the i-th image $x_i$ and a vector $y_i$ for the image's labels.

Conventional visual-semantic approaches which use the pairwise hinge-ranking function noted above have drawbacks, however. For example, although each image $x_i$ may correspond to multiple labels in set of text labels $y_i$, one or more pairs of those labels may be embedded in positions that are relatively far away from one another in the continuous semantic label space S. Thus, pushing the embedding of an entire image $f(x_i)$ so that the i-th image $x_i$ is embedded at a position in the embedding space close to the multiple text labels (that are embedded at positions relatively far away from one another) can cause errors with the mapping function. In addition or alternately, doing so can result in mapping the image $x_i$ to an average position of the label vectors, such that the average position corresponds to a different semantic concept than the concepts described by the individual text labels.

In contrast to conventional visual-semantic embedding techniques, the MIE module 114 is configured to use the following loss function in one or more implementations to learn multi-instance embedding for the joint image-text embedding space 302:

$$l_{MIE}(x_i, y_i) = \sum_{j \in \tau_+} \sum_{k \in \tau_-} \max\left(0, m + \min_{c \in C} D_{f(x_i^c), y_i} - \min_{c \in C} D_{f(x_i^c), y_k}\right)$$

Here, the term $x_i^c$ represents a particular region c of the i-th image $x_i$, e.g., a region that was generated in the manner described above to correspond to one of the text labels associated with the i-th image $x_i$. The term C represents the set of regions generated for the i-th image $x_i$. Further, $\{y_j\}_{j \in \tau_+}$ denotes the positive label vectors, $\{y_k\}_{k \in \tau_-}$ denotes the negative label vectors, and $D_{f(x_i^c), y_j}$ indicates a distance between the embedding of the image region $f(x_i^c)$ and the corresponding text label $y_j$ for which that image region is generated. In one or more implementations, the MIE module 114 computes the distance as a squared Euclidean distance. Further and as shown in the loss equation to learn the multi-instance embedding, the MIE module 114 can model region-to-label correspondences through application of a minimum operation (e.g., the min term) on the distances from a label to each region of the set of regions. In so doing, the MIE module 114 selects at least one region of a training image to explain the semantic concept described by each text label of the training image. Additionally, the MIE module 114 is more likely to select the region for a text label that has a closest embedded position in the embedding space to the text label.

In one or more implementations, the MIE module 114 optimizes a ranking of the predicted text labels for the regions of a training image. To do so, the MIE module 114 uses an adjusted multi-instance embedding loss formula that encourages positive text labels (e.g., those associated with the training image) to have smaller min-distances than most negative text labels. In this way, the MIE module 114 ranks the positive text labels at a top of a list of predicted text labels for a given region of a training image. In other words, the MIE module 114 penalizes false predictions that rank positive text labels at a bottom of the list. By way of example, the MIE module 114 may be configured to optimize the ranking of the predicted text labels according to the following adjusted formula:

$$\widetilde{l_{MIE}}(x_i, y_i) = \sum_{j \in \tau_+} \sum_{k \in \tau_-} w(r_j) \cdot \max\left(0, m + \min_{c \in C} D_{f(x_i^c), y_i} - \min_{c \in C} D_{f(x_i^c), y_j}\right)$$

Here the term $w(\bullet)$ is a weight function, and the term $r_j$ is a rank of a positive text label in a list of predicted text labels for a given region of a training image. In one or more implementations, the MIE module 114 determines the term $r_j$ according to the following:

$$r_j = \sum_{t \neq j} \mathbb{1}\left(\min_{c \in C} D_{f(x_i^c), y_t} \leq \min_{c \in C} D_{f(x_i^c), y_k}\right)$$

Here $\mathbb{1}(\bullet)$ is an indicator function, which the MIE module 114 uses for the i-th image $x_i$ to rank a predicted text label $y_t$ according to its distance (e.g., in the joint image-text embedding space 302) to each region in the set of regions C. In particular, the MIE module 114 computes the ranking as a function of the minimum distance to each region, which is represented by the term $\min_{c \in C} D_{f(x_i^c), y_t}$. Further, the MIE module 114 can be configured to use a weight function defined as follows:

$$w(r) = \begin{cases} 1 & \text{if } r < \#(\tau_+), \\ r & \text{otherwise} \end{cases}$$

Here, the term $\#(\tau_+)$ represents a number of text labels associated with the i-th image $x_i$. Thus, if one of the text labels associated with the i-th image $x_i$ is one of the top-$\#(\tau_+)$ text labels in the prediction list, then the MIE module 114 penalizes the loss by assigning a smaller number to the weight. For example, if the i-th image $x_i$ is associated with five text labels and one of the associated text labels is one of the top-five ranked labels in the list of text labels predicted for the image, then the MIE module 114 penalizes the computed loss by assigning a smaller number to the weight. In contrast, if one of the labels associated with the i-th image $x_i$ is not one of the top-$\#(\tau_+)$ text labels in the prediction list, then the MIE module 114 penalizes the loss by assigning a larger number to the weight.

Continuing with the example in which the i-th image $x_i$ is associated with five text labels, consider a scenario in which one of the associated text labels is not one of the top-five ranked labels in the list of text labels predicted for the image. In this case, the MIE module 114 penalizes the computed loss by assigning a larger number to the weight. By applying a penalty to the loss function in this way, the MIE module 114 maps semantically meaningful regions closer to their corresponding labels in the joint image-text embedding space 302. After the regions of the training images (e.g., those included in image database 304) are mapped to the text labels (e.g., those included in the text vocabulary 306) in the joint image-text embedding space 302, it can be used by the MIE module 114 to find text labels for unannotated images.

Consider an example in which the MIE module 114 is given an image to annotate x', e.g., in conjunction with indexing images for search. In a similar manner as regions are generated for the training images, the MIE module 114 generates a set of regions C' for the image-to-be-annotated x', e.g., the MIE module 114 applies a region proposal technique (e.g., geodesic object proposal or random region proposal) to the image-to-be-annotated, then applies post processing techniques to the proposed regions to reduce the number of proposed regions for the image-to-be-annotated.

The MIE module 114 then passes the image-to-be-annotated and the set of regions generated therefrom through the joint image-text embedding space 302 to obtain embedding vectors for each of the regions. Given the mapping function discussed above, the MIE module 114 computes embedding vectors for set of regions of the image-to-be-annotated such that an embedding vector $f(x'^c)$ is obtained for a given region c. Then for any of the text labels y' in the joint image-text embedding space 302, the MIE module 114 computes a distance between the image-to-be-annotated x' and positions of the text labels y' in the joint image-text embedding space 302 by $\min_{c \in C'} D_{f(x'^c), y'}$. Thus, the MIE module 114 determines, for each region of the image-to-be-annotated, a text label to which the region is closest in the joint image-text embedding space 302, e.g., based on a distance between the embedding vector determined for the region and a position of the text label in the joint image-text embedding space 302.

The MIE module 114 then ranks the text labels that are determined for the image-to-be-annotated. In particular, the MIE module 114 ranks the determined text labels according to the distances between the embedding vectors of the regions and the respective text labels, such that text labels for which the distance to the respective region is lesser are ranked more favorably. Accordingly, the determined text label for which the distance to the respective region is least is the top ranked text label. Using the ranking, the MIE module 114 generates a ranked list of text labels that are determined to correspond to the regions of the image-to-be-annotated. The MIE module 114 can then annotate the image-to-be-annotated with a predetermined number of labels from the list. By way of example and not limitation, the MIE module 114 can annotate the image-to-be-annotated with the top-five ranked text labels from the list of text labels that correspond to the regions. Regardless of the predetermined number, the MIE module 114 is configured to use the joint image-text embedding space 302 to annotate images with multiple text labels.

As described briefly above, the joint image-text embedding space 302 is also configured to model semantic concepts, which are described by the text labels and to which the representative images are mapped, as distributions, e.g., Gaussian distributions, Gaussian mixtures, and so on.

Figure 4:
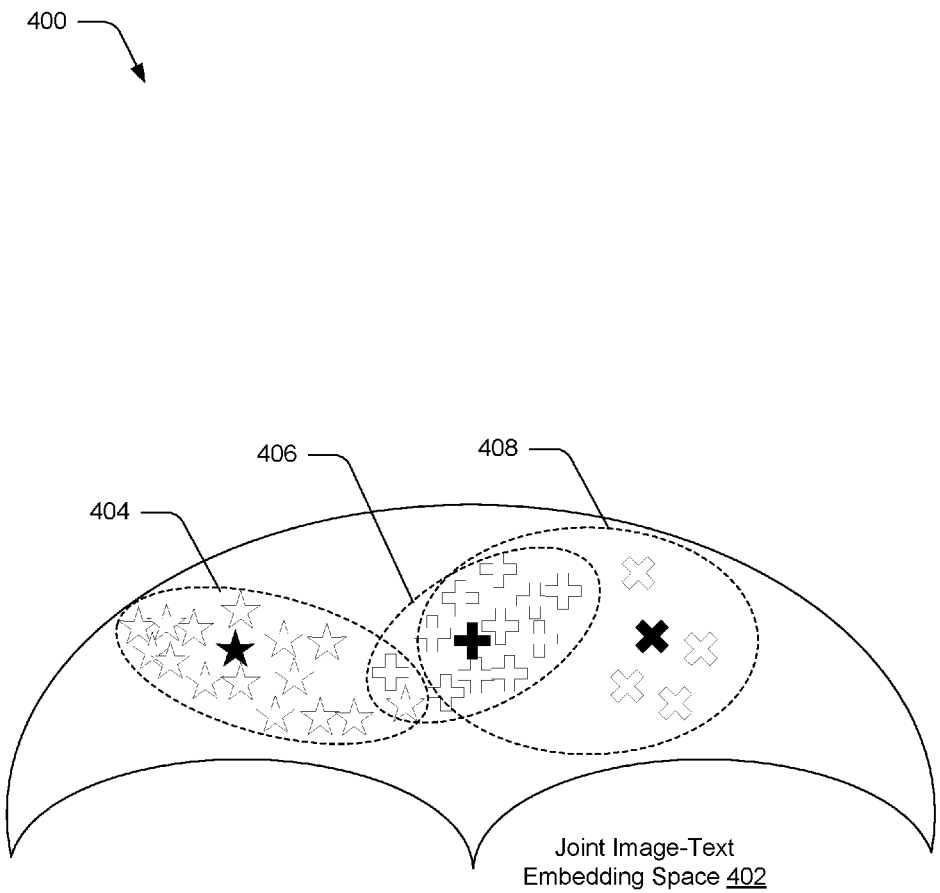
FIG. 4 is another example implementation of the embedding space in which the semantic concepts described by the text labels are modeled as distributions in the embedding space.

FIG. 4 depicts at 400 an example of an embedding space that represents semantic concepts described by text labels as distributions. In particular, the example 400 depicts joint image-text embedding space 402 that includes distributions 404, 406, 408. The distributions 404, 406, 408 may, for instance, represent the semantic concepts of tree, apple, and fruit, respectively. It should be noted that there is some overlap between the distributions 404, 406, 408, which represents that the semantic concepts represented by the text labels can overlap. In other words, the semantic concepts represented by text labels for "tree", "apple", and "fruit" can overlap, in part because, an apple can correspond to a tree, and can also correspond to a fruit. Accordingly, semantic concepts are modeled as distributions in the joint image-text embedding space 402 rather than as single points.

The MIE module 114 learns the joint image-text embedding space 402 to generate it by modeling each semantic concept described by the text labels. By way of example, the MIE module 114 models each of the semantic concepts as a Gaussian distribution as follows:

$$t_k \sim N(\mu_k, \Sigma_k), \forall_k \in (1, \ldots, M)$$

Here, the term M represents a number of text labels in a text vocabulary used to train the joint image-text embedding space 402. The term $t_k$ represents the k-th text label t in the text vocabulary, the term $\mu_k$ represents a vector of the k-th text label t (e.g., a Glove feature of the text label that is obtained from a Glove model for text label representation), the term $\Sigma_k$ represents an identity matrix that is initialized to the joint image-text embedding space 402, and $N(\cdot)$ represents a distribution modeling function (e.g., standard Gaussian distribution although other distributions can be used). In one or more implementations, the MIE module 114 learns the distributions for the joint image-text embedding space 402 by deep neural network. The MIE module 114 can represent a given image I in a set of training images by Convolution Neural Network (CNN), and can initialize an image embedding weight for the image according to a loss function, e.g., a ranking loss. With regard to the term the term $\Sigma_k$, the MIE module 114 learns it by minimizing a loss for each image I in the set of training images as follows:

$$\text{loss}(I) = \sum_{\substack{n=1 \\ n \neq i}}^{M} \max(0, m + (I - \mu_i)^T \mu_i^{-1} (I - \mu_i) - (I - \mu_n)^T \mu_n^{-1} (I - \mu_n))$$

With reference to this equation, the MIE module 114 is configured to model the positive text labels $t_i$ for a given image I as $N(\mu_i, \Sigma_i)$, and model the negative text labels $t_n$ for the given image as $N(\mu_n, \Sigma_n)$. As in the equations above, m represents a margin term.

Although implementations of modeling semantic concepts as distributions in an embedding space are described with reference primarily to Gaussian distributions, it should be appreciated that the MIE module 114 is configured to model the semantic concepts described by the text labels in an embedding space using a variety of other distributions without departing from the spirit or scope of the techniques described herein. By way of example and not limitation, the MIE module 114 is also capable of modeling the semantic concepts described by text labels in an embedding space as Gaussian mixtures, Log-normal distributions, Pareto distributions, and so on.

By modeling the semantic concepts described by text labels as distributions rather than single points, the techniques described herein enable the semantic concepts to overlap. This results in the generation of an embedding space that more accurately represents the relationships between semantic concepts than do embedding spaces that model semantic concepts as single points, e.g., because many semantic concepts overlap. For example, the semantic concepts of sun and sunset overlap, but so do the semantic concepts of sun and sunrise. In any case, the MIE module 114 is configured to generate embedding spaces that model the semantic concepts described by text labels of a text vocabulary as distributions.

Having discussed example details of the techniques for embedding space for images with multiple text labels, consider now some example procedures to illustrate additional aspects of the techniques.

Example Procedures

This section describes example procedures for embedding space for images with multiple text labels in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 that makes use of an MIE module 114.

Figure 5:
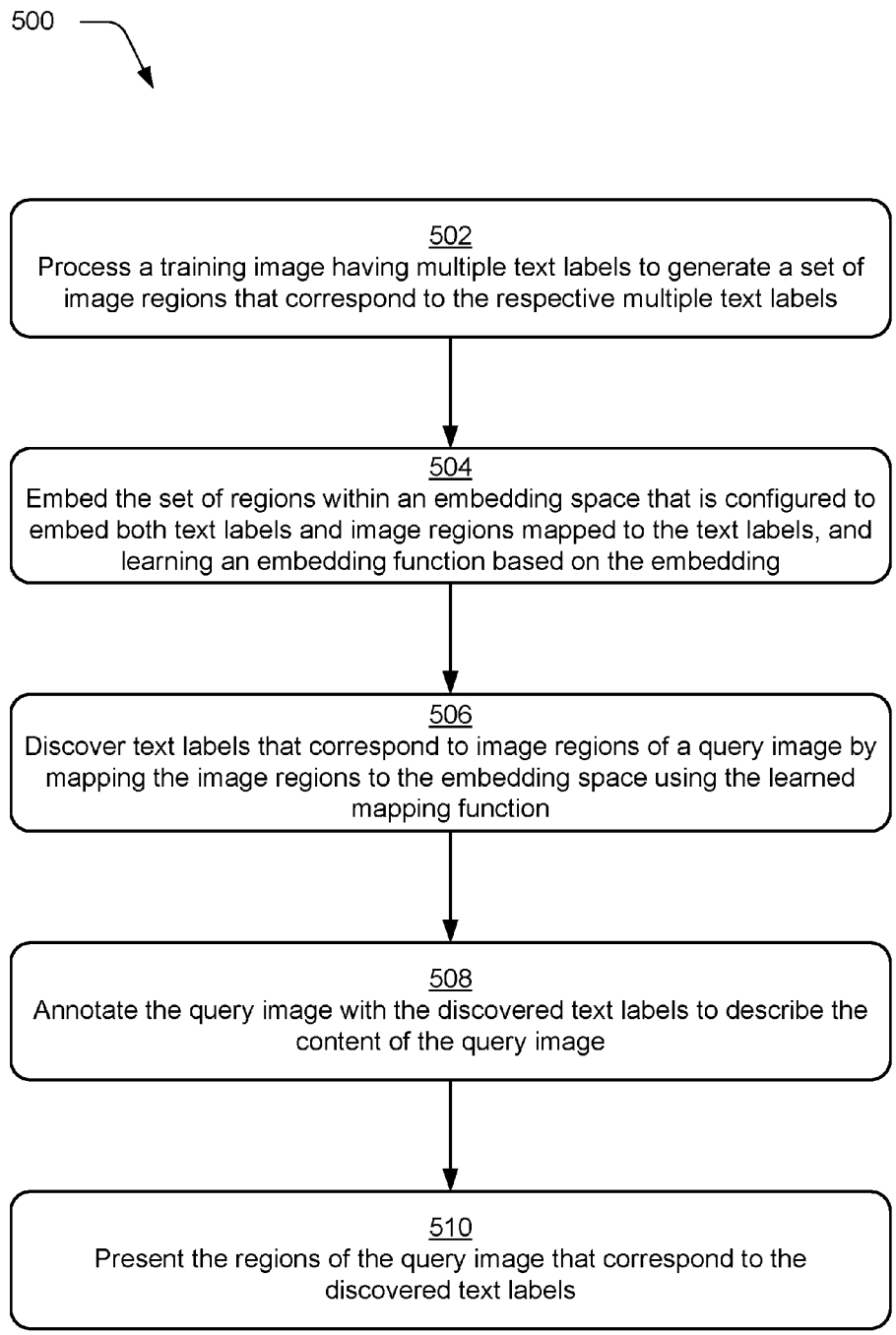
FIG. 5 is a flow diagram depicting a procedure in an example implementation in which regions of a training image associated with multiple text labels are mapped to the corresponding text labels in an embedding space to train the embedding space, and in which text labels are discovered for a query image using the embedding space.

FIG. 5 depicts an example procedure 500 in which regions of a training image associated with multiple text labels are mapped to the corresponding text labels in an embedding space to train the embedding space, and in which text labels are discovered for a query image using the embedding space. A training image associated with multiple text labels is processed to generate a set of image regions that correspond to the respective multiple text labels (block 502).

For example, assume that the image 202 corresponds to a training image and is already associated with the text labels 204, 206, 208, 210, 212. In this scenario, the MIE module 114 processes the image 202 to generate the image regions 214, 216, 218, 220 to correspond to the text labels, such that the image region 214 is generated to correspond to the text label 208, the image region 216 is generated to correspond to the text label 206, the image region 218 is generated to correspond to the text label 204, the image region 220 is generated to correspond to the text label 210, and the image region representative of the entirety of the image 202 is generated to correspond to the text label 212. As discussed in greater detail above, the MIE module 114 generates the image regions by applying a region proposal technique and performing post processing techniques on the proposed candidate regions. The MIE module 114 also generates the corresponding regions by selecting a best-matching region for each of the text labels 204, 206, 208, 210, 212, e.g., based on a distance between positions at which the regions would be embedded in the embedding space and a position of the text label in the embedding space.

The set of regions is embedded within an embedding space configured to embed both text labels and image regions mapped to the text labels (block 504). Further, the set of regions is embedded based, at least in part, on positions at which the multiple text labels that correspond to the image regions of the training image are embedded in the embedding space. And, the embedding of the set of regions is effective, along with embedding sets of regions of other training images, to learn a mapping function. By way of example, the MIE module 114 embeds the image regions 214, 216, 218, 220, and the image region that corresponds to the entirety of the image 202 in the joint image-text embedding space 302. The MIE module 114 does so based, at least in part, on positions at which the text labels 204, 206, 208, 210, 212 are embedded in the joint image-text embedding space 302.

As discussed in more detail above, the MIE module 114 computes feature vectors for each of the image regions 214, 216, 218, 220, and the image region that corresponds to the entirety of the image 202, to embed them in the joint image-text embedding space 302, e.g., by extracting image features with a Convolutional Neural Network (CNN) such as a Fast Region-based CNN (RCNN) technique. Additionally, when the MIE module 114 embeds the image regions 214, 216, 218, 220, and the image region that corresponds to the entirety of the image 202 in the joint image-text embedding space 302, the MIE module 114 maps the regions to the corresponding text labels to learn a mapping function, e.g., so that images and image regions without text labels can be mapped to a position in the joint image-text embedding space 302.

Once the embedding space is trained, the learned mapping function is usable to discover text labels from the embedding space for images, e.g., for image tagging, for multiple-text based image search (to identify images as corresponding to searches), image captioning, and so on. Text labels that correspond to image regions of a query image are discovered using the trained embedding space (block 506). To discover the text labels, the image regions are input into the learned mapping function, which maps the image regions to text labels of the embedding space.

Assume now that the image 202 corresponds to the query image and that the text labels 204, 206, 208, 210, 212 have not yet been associated with the image 202. In this scenario, the image regions 214, 216, 218, 220, and the image region that corresponds to the entirety of the image 202 to text labels in the joint image-text embedding space 302 can serve as input to the learned mapping function.

Mapping the image regions 214, 216, 218, 220, and the image region that corresponds to the entirety of the image 202 to the joint image-text embedding space 302 according to the learned mapping function allows a comparison to be performed with the image regions embedded in the joint image-text embedding space 302. In one or more implementations, the comparison is performed by comparing feature vectors extracted for the image regions 214, 216, 218, 220, and the image region that corresponds to the entirety of the image 202 to feature vectors of the image regions embedded in the joint image-text embedding space 302 as part of training. The MIE module 114 assigns the image regions 214, 216, 218, 220, and the image region that corresponds to the entirety of the image 202 the embedded text labels to which the similar embedded image regions are mapped. In this fashion, the MIE module 114 discovers the text labels 204, 206, 208, 210, 212 in the joint image-text embedding space 302 for the image regions 214, 216, 218, 220, and the image region that corresponds to the entirety of the image 202.

The query image is annotated with the discovered text labels to describe the content of the query image (block 508). By way of example, the MIE module 114 annotates the image 202 with the text labels 204, 206, 208, 210, 212, e.g., by including them with the image 202 as metadata or associating them with the image 202 in some other manner.

The regions of the query image that correspond to the text labels are presented (block 510). By way of example, a user request is received to present the regions of the image 202 that correspond to the text labels with which the image 202 is annotated. The MIE module 114 presents indications (e.g., bounding boxes) of one or more of the image regions 214, 216, 218, 220, and the image region that corresponds to the entirety of the image 202, such as over a display of the image 202. It should be appreciated that the MIE module 114 is capable of presenting indications of the image regions in a variety of different ways without departing from the spirit or scope of the techniques described herein. By way of example and not limitation, indications of the image regions can be presented along with corresponding text labels, a region can be changed visually to appear different from other portions of the image (e.g., in focus while the other portions of the image are made blurry), and so on.

Figure 6:
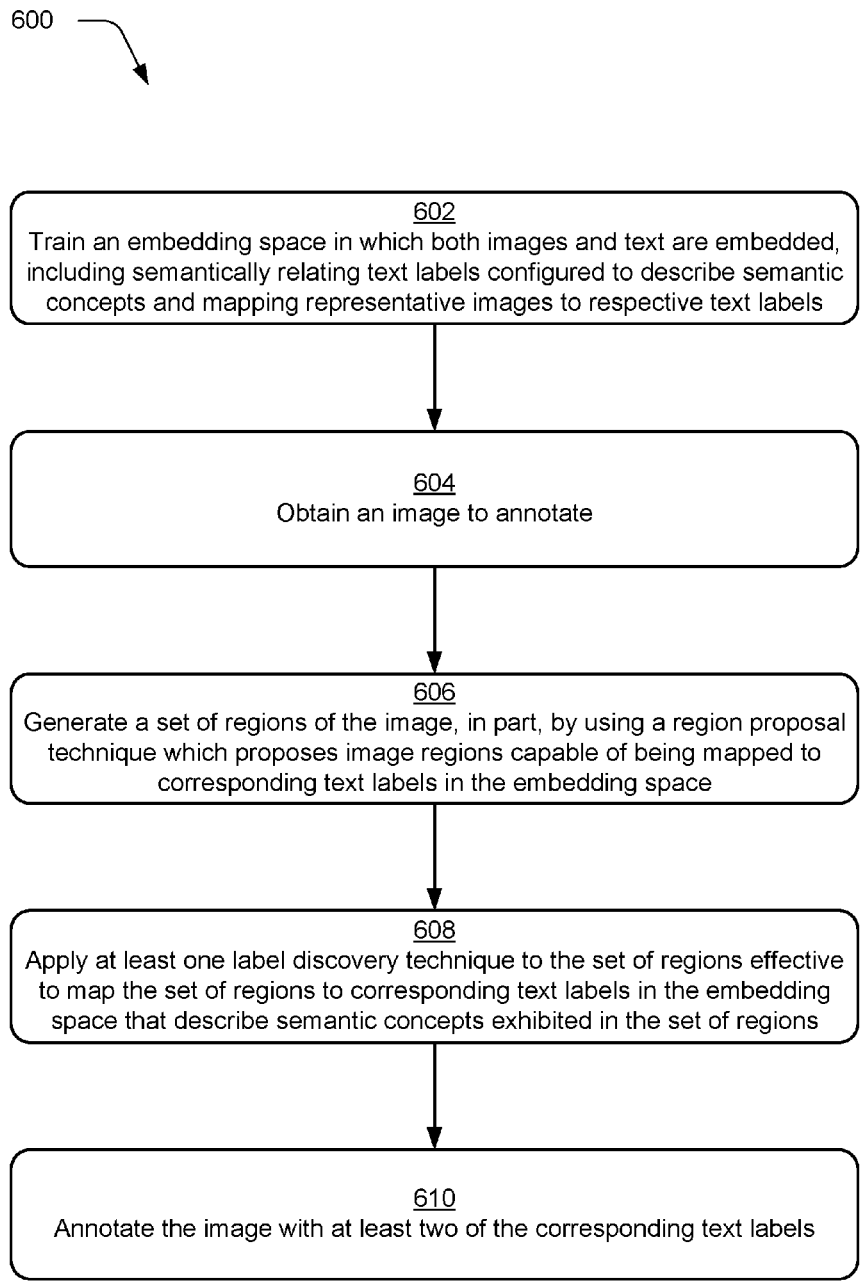
FIG. 6 is a flow diagram depicting a procedure in another example implementation in which a trained embedding space is used to associate multiple text labels with respective regions of an image to be annotated.

FIG. 6 depicts an example procedure 600 in which a trained embedding space is used to associate multiple text labels with respective regions of an image to be annotated. An embedding space is trained in which both images and text are embedded (block 602). The training involves semantically relating text labels configured to describe semantic concepts exhibited in image content and mapping representative images that have image content which exemplifies the semantic concepts to respective text labels.

By way of example, the MIE module 114 trains the joint image-text embedding space 302. To do so, the MIE module 114 semantically relates the text labels of the text vocabulary 306, e.g., by leveraging textual data available on the Internet to learn scalable and lexically distributed representations of words to capture semantic meaning among the text labels of the text vocabulary 306. In one or more implementations, the MIE module 114 leverages one or more text modeling architecture techniques to do so, such as the word2vec model, the Glove model, and so on.

Continuing with this example, the MIE module 114 trains the joint image-text embedding space 302 by mapping the representative images of the image database 304 to the respective text labels of the text vocabulary 306 in the joint image-text embedding space 302. For instance, the MIE module 114 maps in the joint image-text embedding space 302 the images of the image set 314 to the text label 308 for "tree", the images of the image set 316 to the text label 310 for "woman", and the images of the image set 318 to the text label 312 for "building". As a result of the training, the MIE module 114 learns a mapping function for mapping image regions to text labels in the joint image text embedding space 302.

Once the joint image-text embedding space 302 is trained, the learned mapping function can be used to annotate images. An image to annotate is obtained (block 604). By way of example, the image 202 is obtained. Assume in this example, that the image 202 is unannotated and is not yet associated with the text labels 204, 206, 208, 210, 212.

A set of regions of the image is generated (block 606). In one or more implementations, the generation involves using a region proposal technique which proposes regions that are capable of being mapped to corresponding text labels in the embedding space. By way of example, the MIE module 114 generates a set of regions for the image 202, which includes the image regions 214, 216, 218, 220, and the image region that corresponds to the entirety of the image 202. The MIE module 114 generates the set of regions for the image 202 in the manner described in more detail above. The regions generated are semantically meaningful and capable of being mapped to an embedded text label in the embedding space.

The set of regions are input into the leaned mapping function to map the set of regions to corresponding text labels in the embedding space that describe semantic concepts exhibited in the set of regions (block 608). By way of example, the MIE module 114 uses the mapping function, learned by training the joint image-text embedding space 302 at block 602, to discover text labels for the set of regions generated for the image 202 at block 606. In particular, the MIE module 114 uses the learned mapping function to map the set of regions to the text labels embedded in the joint image-text embedding space 302 that describe the semantic concepts exhibited in each of the image regions 214, 216, 218, 220, and the image region that corresponds to the entirety of the image 202. In particular, the MIE module 114 uses the learned mapping function to map the image region 214 which depicts a woman to the text label 208 for "woman", the image region 216 which depicts the Eiffel Tower to the text label 206 for "Eiffel Tower", the image region 218 which depicts shopping bags to the text label 204 for "bag", the image region 220 which depicts buildings to the text label 210 for "buildings", and the image region that corresponds to the entirety of the image 202 to the text label 212 for "cityscape".

The image is annotated with at least two of the corresponding text labels (block 610). For example, the MIE module 114 annotates the image 202 with the text labels 204, 206, 208, 210, 212, based on the mapping at block 608. As noted above, a greater number of image regions than those depicted in FIG. 2 may be generated and mapped into the joint image-text embedding space 302. As a result, a list of text labels that correspond to the image 202 can be generated. However, the image 202 may be annotated with a selected group of text labels from the list. By way of example and not limitation, the list of text labels can be ranked as described in more detail above, and the MIE module 114 selects a predetermined number of top-ranked labels for annotation of the image 202.

In addition to using a ranked list, the labels selected for annotating an image may be chosen in other ways. For instance, the labels may be chosen based on a threshold difference of the corresponding region to representative images embedded in the joint image-text embedding space 302. To do so, the MIE module 114 may find a distance (e.g., Euclidean distance) between each region generated for an image and embedded representative images in the joint image-text embedding space 302, e.g., by extracting feature vectors of the image regions and the embedded representative images and comparing the feature vectors. The MIE module 114 can then select text labels for which the image region had a difference with embedded representative images that is less than a threshold difference. The MIE module 114 can select text labels to annotate an image from the text labels determined to correspond to regions of the image in yet other ways without departing from the spirit or scope of the techniques described herein.

Figure 7:
FIG. 7 is a flow diagram depicting a procedure in another example implementation in which an embedding space is generated to model semantic concepts described by text labels as distributions in the embedding space.
Figure 7:

FIG. 7 depicts an example procedure 700 in which an embedding space is generated to model semantic concepts described by text labels as distributions in the embedding space. An embedding space in which both images and text labels can be embedded is generated such that semantic concepts described by text labels in a text vocabulary are modeled as distributions in the embedding space (block 702). The generation of the embedding space also includes training the embedding space by embedding representative images in the embedding space so that the representative images map to respective distributions.

By way of example, the MIE module 114 generates the joint-image text embedding space 402 by modeling semantic concepts, described by text labels from a text vocabulary, as distributions, e.g., Gaussian distributions, Gaussian mixtures, and so on. The MIE module 114 generates the joint-image text embedding space 402 to enable image and text label embedding relative to the semantic concepts modeled as distributions. Further, the MIE module 114 trains the joint-image text embedding space 402 by embedding image regions having image content which exemplifies the semantic concepts within respective distributions formed for the semantic concepts.

The embedding space that models the semantic concepts as distributions is used to annotate an image (block 704). By way of example, the MIE module 114 uses the joint-image text embedding space 402 to annotate the image 202 with text labels that describe the content of the image 202. For instance, the MIE module 114 uses the joint-image text embedding space 402 to discover the text labels 204, 206, 208, 210, 212, and then to annotate the image 202 with the discovered labels.

Having described example procedures in accordance with one or more implementations, consider now an example system and device that can be utilized to implement the various techniques described herein.

Example System and Device

Figure 8:
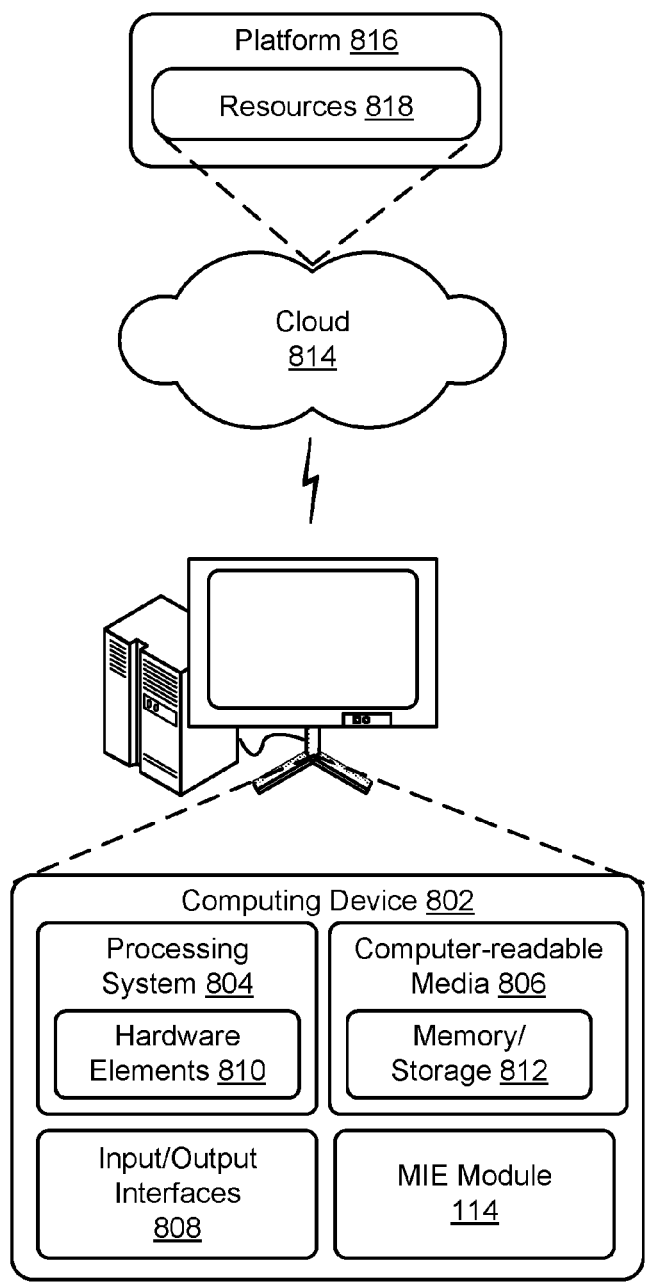
FIG. 8 illustrates an example system including various components of an example device that can be employed for one or more implementations of techniques for embedding space for images with multiple text labels that are described herein.

FIG. 8 illustrates an example system generally at 800 that includes an example computing device 802 that is representative of one or more computing systems and/or devices that implement the various techniques described herein. This is illustrated through inclusion of the MIE module 114, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software are achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributed throughout the system 800. For example, the functionality is implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to annotate individual images with multiple text labels to describe content of the images, the method comprising:
   processing a training image having multiple text labels to generate a set of image regions that correspond to the respective multiple text labels;
   embedding, within an embedding space that is configured to embed both text labels and image regions mapped to the text labels, the set of image regions based, in part, on positions at which the multiple text labels that correspond to the image regions of the training image are embedded in the embedding space;
   learning a mapping function that maps image regions to the text labels embedded in the embedding space, said learning based, in part, on said embedding the set of image regions within the embedding space;
   determining a set of semantically meaningful image regions for a query image;
   processing the set of semantically meaningful image regions of the query image to discard the semantically meaningful image regions of the query image that fail to meet at least one predefined criterion and to obtain a subset of semantically meaningful image regions of the query image that meet the at least one predefined criterion,
   discovering text labels of the embedding space that correspond to criteria-meeting image regions of the query image by mapping the criteria-meeting image regions to the embedding space using the learned mapping function;
   computing distances between the discovered text labels and the criteria-meeting image regions in the embedding space;
   ranking the discovered text labels based on the computed distances; and
   annotating the query image with at least two of the discovered text labels based at least in part on the ranking.

2. A method as described in claim 1, wherein the discovered text labels describe the image content of the query image.

3. A method as described in claim 1, wherein processing the training image to generate the set of image regions that correspond to the respective multiple text labels includes:
   determining candidate image regions for the set of image regions; and
   reducing a number of the determined candidate image regions using at least one post-processing technique.

4. A method as described in claim 3, wherein the candidate image regions are determined using geodesic object proposal.

5. A method as described in claim 1, wherein the at least one predefined criterion includes a threshold size, and the processing is effective to discard the semantically meaningful image regions of the query image having less than the threshold size.

6. A method as described in claim 1, wherein the at least one predefined criterion includes a predefined set of allowable aspect ratios, and the processing is effective to discard the semantically meaningful image regions of the query image having aspect ratios outside the predefined set of allowable aspect ratios.

7. A method as described in claim 3, wherein the at least one post-processing technique assigns a single candidate image region to each of the multiple text labels of the training image using a single label embedding model.

8. A method as described in claim 1, further comprising:
discovering multiple text labels of the embedding space for each of the criteria-meeting image regions; and
for a given criteria-meeting image region:
computing a distance between each of the text labels discovered for the given criteria-meeting image region and the criteria-meeting image region in the embedding space;
ranking the text labels discovered for the given criteria-meeting image region; and
annotating the given criteria-meeting image region with a highest ranking text label.

9. A method as described in claim 1, wherein processing the training image to generate the set of image regions that correspond to the respective multiple text labels includes discarding image regions that fail to meet the at least one predefined criterion.

10. A method as described in claim 1, wherein the distances are computed using vectors that represent respective image regions of the query image, the vectors extracted from the image regions of the query image with a Convolutional Neural Network (CNN).

11. A method as described in claim 1, wherein
the set of semantically meaningful image regions of the query image is determined by using a geodesic object proposal technique in lieu of an object proposal technique that focuses on foreground object detection.

12. A method as described in claim 1, further comprising presenting the image regions of the query image that correspond to the discovered text labels with which the query image is annotated.

13. A method as described in claim 1, further comprising training the embedding space to enable mapping of the image regions to the text labels, including:
semantically relating text labels of a text vocabulary to determine positions at which to embed the text labels in the embedding space;
processing a plurality of training images each having multiple text labels to generate sets of image regions that correspond to the respective multiple text labels; and
embedding, within the embedding space, the sets of image regions based, in part, on differences of a first computed distance in the embedding space with a second computed distance in the embedding space, the first computed distance being between an embedding of an individual image region of a set of image regions and a respective text label for which the individual region is generated, the second computed distance being between the embedding of the individual region and a set of negative text label vectors.

14. A method as described in claim 13, wherein the text labels of the text vocabulary are semantically related based on the Glove model.

15. A system to annotate individual images with multiple text labels to describe content of the images, the system comprising:
one or more processors; and
computer-readable storage media having stored thereon instructions that are executable by the one or more processors to perform operations comprising:
training an embedding space in which both images and text labels are embedded, said training semantically relating text labels configured to describe semantic concepts exhibited in image content and mapping representative images that have image content which exemplifies the semantic concepts to respective text labels;
learning a mapping function based on the training that maps image regions to the text labels embedded in the embedding space;
obtaining a query image to annotate;
determining a set of semantically meaningful image regions of the query image;
processing the set of semantically meaningful image regions of the query image to reduce the set to a subset of semantically meaningful image regions of the query image that meet at least one predefined criterion;
after reduction to the subset, mapping criteria-meeting image regions of the query image to corresponding text labels of the embedding space using the mapping function, the corresponding text labels describing semantic concepts exhibited in image content of the criteria-meeting image regions of the query image; and
annotating the query image with at least two of the corresponding text labels.

16. A system as described in claim 15, wherein at least one region of the subset of semantically meaningful image regions of the query image comprises less than an entirety of the query image.

17. A method implemented by a computing device to annotate individual images with multiple text labels to describe content of the images, the method comprising:
training an embedding space in which both images and text labels are embedded, said training semantically relating text labels configured to describe semantic concepts exhibited in image content and mapping representative images that have image content which exemplifies the semantic concepts to respective text labels;
determining a set of semantically meaningful image regions for a query image;
processing the set of semantically meaningful image regions of the query image to reduce the set to a subset of semantically meaningful image regions that meet at least one predefined criterion;
discovering text labels of the trained embedding space that correspond to criteria-meeting image regions of the query image by mapping the criteria-meeting image regions to the trained embedding space; and
associating at least two discovered text labels with the query image based on a ranking that ranks the at least two discovered text labels relative to at least a third discovered text label according to computed distances in the embedding space between discovered text labels and respective criteria-meeting image regions of the query image.

18. A method as described in claim 17, wherein one of the at least two discovered text labels associated with the query image is used to identify the query image as corresponding to a search.

19. A method as described in claim 17, wherein at least two respective criteria-meeting image regions that correspond to the at least two discovered text labels comprise less than an entirety of the query image.

* * * * *